United States Patent Office 2,758,997
Patented Aug. 14, 1956

2,758,997

7-CHLORO-4-(4-DI-n-BUTYLAMINOBUTYLAMINO)-3-METHYLQUINOLINE AND SALTS THEREOF

Edgar Alfred Steck, Guilderland, N. Y., assignor to Sterling Drug Inc., New York, N. Y., a corporation of Delaware No Drawing. Application March 19, 1953,
Serial No. 343,527

3 Claims. (Cl. 260—286)

This invention relates to 7-chloro-4-(4-di-n-butylaminobutylamino)-3-methylquinoline, to its preparation and to its acid addition salts.

The compound of my invention, either in its free base form or in the form of its acid addition salts, is effective against both extra-intestinal and intestinal amebiasis. It has high activity in vitro against Endamoeba histolytica and in vivo against Endamoeba criceti in the intestine of the hamster.

My basic quinoline was prepared by heating 4,7-dichloro - 3 - methylquinoline and 4-di-n-butylaminobutylamine. This reaction can be carried out by heating a mixture of the reactants directly or, preferably, using phenol as the reaction medium. Optional but preferable was the use of a trace of potassium iodide to facilitate the condensation of the two reactants.

The intermediate 4-di-n-butylaminobutylamine was prepared by catalytic hydrogenation of gamma-di-n-butylaminobutyronitrile in a solution of ammoniacal ethanol under pressure. The gamma-di-n-butylaminobutyronitrile was synthesized preferably by heating gamma-chlorobutyronitrile with di-n-butylamine.

It was convenient to isolate and use the basic quinoline of my invention as the water soluble phosphoric acid addition salt, the particular phosphate isolated being the triphosphate. It is, of course, understood that other water soluble salts, such as those derived from other non-toxic inorganic acids, including hydrochloric acid, hydrobromic acid, sulfuric acid, sulfamic acid, and the like, and non-toxic organic acids, including tartaric acid, citric aid, succinic acid, acetic aid, benzoic acid, oleic acid, and the like, will serve the same purpose and are within the scope of my invention.

My invention is further illustrated as follows:

*Gamma-di-n-butylaminobutyronitrile.*—Eighty g. of gamma-chlorobutyronitrile was mixed with 283 g. of di-n-butylamine and stirred while being refluxed gently for about four hours. The di-n-butylamine hydrochloride that separated on cooling the reaction mixture was collected and washed well with ether. Fractionation of the filtrates gave a 76% yield of gamma-di-n-butylaminobutyronitrile, B. P. 130–133° C. (10 mm); $n_D^{25}$ 1.4402.

*Analysis.*—Calcd. for $C_{12}H_{24}N_2$: N, 14.27. Found: N, 14.30.

*4-di-n-butylaminobutylamine.*—The reduction of 94.0 g. of gamma-di-n-butylaminobutyronitrile in 370 cc. of 30% w./w. ammoniacal ethanol, using 200 g. ethanol-wet Raney nickel, was carried out by hydrogenation, at 1000 lbs./sq. in. and 20° C. One hour was required for the hydrogenation. Fractionation of the filtered reaction mixture afforded 4-di-n-butylaminobutylamine in 91% yield, B. P. 108–109° C. (5 mm.); $n_D^{25}$ 1.4469.

*Analysis.*—Calcd. for $C_{12}H_{28}N_2$: N, 13.98. Found: N, 13.97.

*7-chloro-4-(4-di-n-butylaminobutylamino) - 3 - methylquinoline.*—A mixture of 21.2 g. of 4,7-dichloro-3-methylquinoline, 44 g. of 4-di-n-butylaminobutylamine and 200 mg. of potassium iodide in 60 g. of phenol was heated at 160–165° C. The reaction was complete after thirteen hours and the viscous material quenched in excess ice-cold 35% aqueous sodium hydroxide, and then extracted with methylene chloride. The methylene chloride extract was, in turn, extracted with 2 N hydrochloric acid and then the aqueous portion made alkaline, extracted with methylene chloride, and dried over anhydrous sodium sulphate. When the solvent had been removed, the residue was distilled to yield 7-chloro-4-(4-di-n-butylaminobutylamino)-3-methylquinoline as a viscous golden oil; B. P. 190–193° C. (0.08 mm.); $n_D^{25}$ 1.5741. A 70% yield was obtained.

*Analysis.*—Calcd. for $C_{22}H_{34}ClN_3$: C, 70.28; H, 9.11; N, 11.18. Found: C, 69.98; H, 8.74; N, 11.18.

The foregoing reaction can be run without using phenol and/or potassium iodide. Alternatively, other solvents, such as para-cymene, can be used in place of phenol.

The foregoing basic quinoline was converted into its phosphoric acid addition salt according to the following procedure: A solution of 25.5 g. of 7-chloro-4-(4-di-n-butylaminobutylamino)-3-methylquinoline in 150 cc. of propanol-2 at 5° C. was treated with 25.4 g. of 85% phosphoric acid in 100 cc. ethanol (also at 5° C.). The resulting mixture was allowed to stand and then triturated with a glass rod, whereupon a creamy-white precipitate separated. This precipitate was collected and washed with ether. It was then suspended in 500 cc. of ethanol at the boiling point of the latter and boiling water added to effect solution; decolorizing charcoal was added and the mixture boiled, then filtered. The product that separated was collected and dried, 32.0 g. being obtained. A yield of 20.5 g. of 7-chloro-4-(4-di-n-butylaminobutylamino)-3-methylquinoline triphosphate, M. P. 186–186.6° C. (corr.), was obtained after two more crystallizations.

*Analysis.*—Calcd. for $C_{22}H_{34}ClN_3 \cdot 3H_3PO_4$: N, 6.27; $H_3PO_4$, 43.90. Found: N, 6.17; $H_3PO_4$, 44.20.

7-chloro-4-(4-di-n-butylaminobutylamino) - 3 - methylquinoline, in the form of its triphosphate, was tested for amebacidal activity in infected hamsters by oral administration via stomach tube of the daily dose, dissolved in 10 percent autoclaved gelatin, on five successive days. The medicated hamsters were sacrificed on the day following the last dose and examined for amebae. A daily dose of 300 mg./kg. of 7-chloro-4-(4-di-n-butylaminobutylamino)-3-methylquinoline triphosphate cleared twelve out of twelve hamsters of *E. criceti*, and a daily dose of 150 mg./kg. similarly cleared fourteen out of seventeen animals.

I claim:

1. A compound selected from the group consisting of 7-chloro-4-(4-di - n - butylaminobutylamino) - 3 - methylquinoline and acid addition salts thereof.

2. 7-chloro-4-(4-di-n-butylaminobutylamino)-3-methylquinoline.

3. 7-chloro-4-(4-di-n-butylaminobutylamino)-3-methylquinoline triphosphate.

References Cited in the file of this patent

UNITED STATES PATENTS 2,233,970   Andersag et al. _____ Mar. 4, 1941

FOREIGN PATENTS 212,595   Switzerland _____ Mar. 3, 1941

OTHER REFERENCES

Weislogle: Survey of Anti-Malarials, vol. 11, part 2 (1946), pp. 1146 and 1149.